Patented Sept. 15, 1953

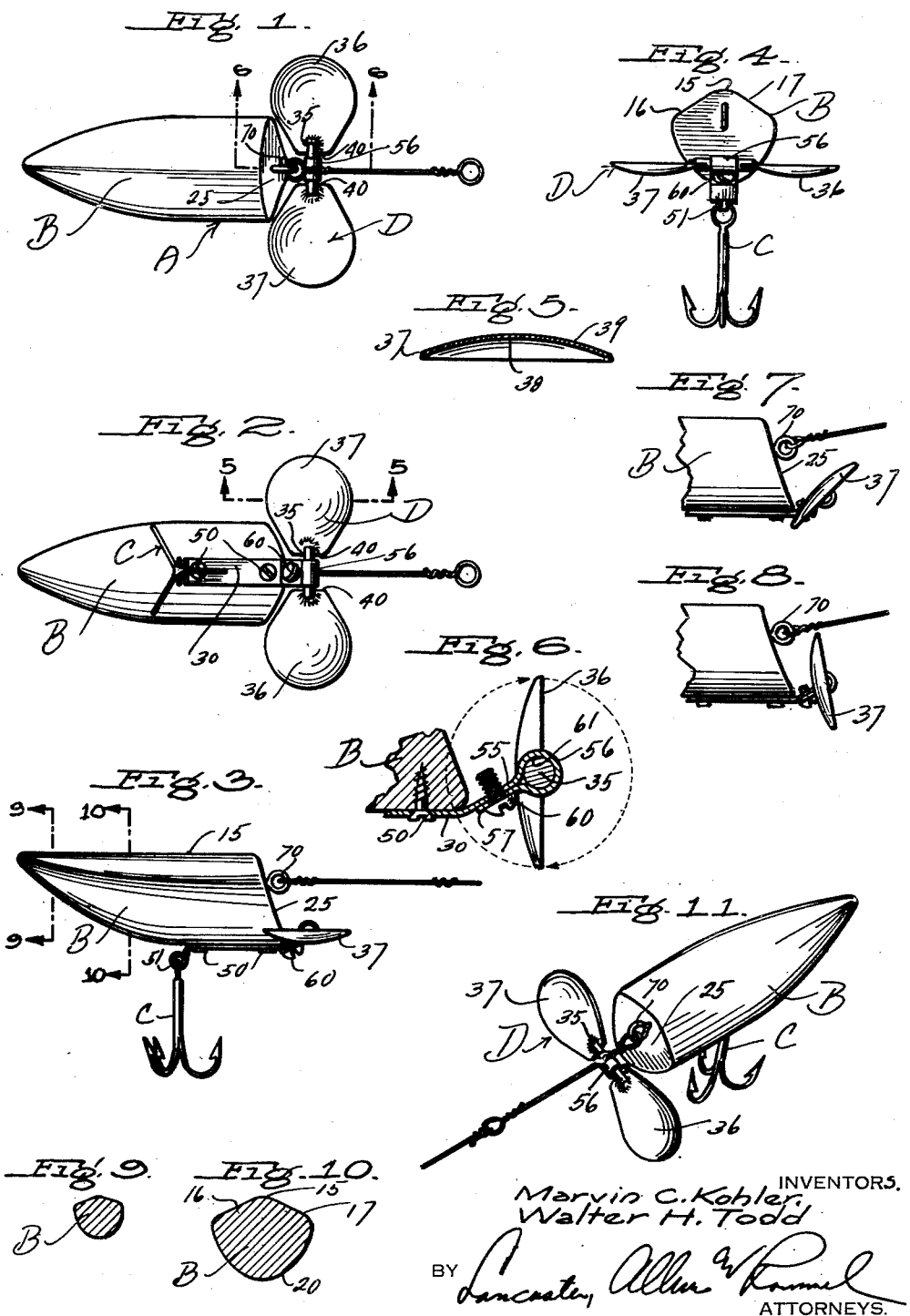

2,651,876

UNITED STATES PATENT OFFICE 2,651,876

FISHING LURE

Marvin C. Kohler and Walter H. Todd,
Merced, Calif.

Application October 20, 1947, Serial No. 780,996

5 Claims. (Cl. 43—42.22)

This invention relates to improvements in artificial bait.

The primary object of this invention is the provision of a fish lure having improved means to enable the same to be trolled or cast and moved along the surface or at varying water depth.

A further object of this invention is the provision of an improved fish lure provided with an adjustable vane construction to efficiently maintain the lure in desired position upon or under the water.

Other objects and advantages of the invention will be apparent from the following detailed description.

In the accompanying drawing, forming a part of this specification, and wherein similar reference characters designate corresponding parts thruout the several views—

Figure 1 is a plan view of the lure showing the vane structure in horizontal position.

Figure 2 is a bottom plan view of the lure.

Figure 3 is a side elevation of the lure.

Figure 4 is a front elevation of the lure.

Figure 5 is a transverse cross sectional view taken thru one of the vanes or blades of the lure substantially on the line 5—5 of Figure 2.

Figure 6 is a fragmentary cross sectional view taken thru the lure substantially in the position shown by the line 6—6 of Figure 1, but with the vane structure shown in vertical instead of horizontal position; the dotted line showing that the vanes or blades may be rotated thru 360°.

Figure 7 is a fragmentary side elevation of the front of the lure showing the vane or blade structure positioned at about 45° to enable the lure to swim on top of the water during trolling or casting.

Figure 8 is a view similar to Figure 7 but with the blade or vane structure arranged so as to cause the lure to dive during trolling or casting.

Figures 9 and 10 are cross sectional views on lines 9—9 and 10—10, respectively, of Fig. 3 showing the cross section of the body structure of the lure.

Figure 11 is a perspective view showing the details of the lure.

In the accompanying drawing, forming a part of this specification, and wherein for the purpose of illustration is shown only a preferred embodiment of the invention, the letter A may generally designate the improved lure. It includes a body structure B having a hook construction C attached thereto, and an improved vane or blade structure D.

The body structure B may be of any approved construction, altho in the present instance it tapers divergently from front to rear. The upper surface presents a straight edge 15 and the upper surface from this straight edge tapers with flat surfacing at 16 and 17 to the side edges. The bottom surfacing 20 is convex and the rear end tapers convergently both in plan and side elevation as shown. The front surface 25 may be flat or slightly concaved and it is arranged in a plane at an angle of greater than 90° with respect to the top edge 15 of the body, so that inherently the body as it is pulled thru the water either when trolling or casting has a slight tendency to dive. The body construction, however, is optional.

The hook construction C may be varied. A three pronged hook is shown and it may be attached slightly forward of the center of the body portion B upon an attaching strip 30 which also serves to attach the vane structure D in position.

The vane structure D consists of a supporting shaft 35 having spoon-shaped blades or vanes 36 and 37 each of which provides a concave surface 38 and a convex surface 39. The surfaces curve as to convexity and concavity both transversely and along the axis thereof. The blades are attached at the ends of the shaft 35, where the blades present straight line edges 40; the attachment being effected by soldering or otherwise, depending upon the nature of the material of the vanes, since metal, plastic or any approved material may be used.

The attaching strip 30 is detachably secured as by screws 50 longitudinally upon the bottom of the body B, forwardly thereof. The rear end of this strip is reduced and rolled at 51 to pivotally receive the swinging hook structure C. As shown in Figure 6, the fore end of the strip 30 extends beyond the nose of the body B, is upturned slightly at 55, and provided with a roll type bearing 56 which may be expanded or contracted; the free end 57 of the strip being doubled upon the portion 55 and therebeneath. A clamping screw 60 is threaded thru suitable openings in the portions 55 and 57, as shown in Figure 6, to enable expansion or contraction of the opening 61 of the bearing 56. The bearing 56 receives the shaft 35 along the medial line of the body and forwardly thereof, so that the vanes or blades 36 and 37 lie at opposite sides of the axis and close to the nose of the body. The shaft 35 is in a location close to the bottom edge of the body B and forwardly of the lower portion of the front surface 25.

With the mounting of the blade structure above described, the vanes may be rotated thru 360°. They are in the same plane and the dotted line in Figure 6 designates the 360° of rotation.

The shaft bearing is disposed at the lower portion of the supporting body below the longitudinal axis of the body.

Either the concave or convex sides of the blade may be presented forwardly. However, the concaved sides will most generally be used. The position of the blade or vane structure shown in Figure 7 with the vanes at an approximate angle of 45° to the horizontal or vertical enables the lure to be used as a swimming lure during trolling or casting. The line attaching eye 70 is located just above the center of the front surface 25, and in a non-interfering position with the blade structure, in any position thereof. If the concaved side is presented forwardly with the blades or vanes at an angle of 10° off the vertical, the lure can be used as a "popping" lure, and in this position during casting or trolling it can be made to take short jumps leaping entirely out of the water above the surface.

To provide a diving or depth assuming lure, the concaved surfaces of the lure are disposed in a plane ranging from 10° off the vertical, as shown in Figure 8, to a horizontal position; the inclination being such as to face the concave surface slightly upwardly; the greater the deflection the greater the diving depth of the lure.

It is to be noted that the edges of the blades in any position are quite close to but not interfering with the front surface 25 of the lure, and as shown in Figure 4 of the drawing the blades do not seriously interfere with exposure of the front surface of the lure to the water.

While we prefer to clamp the shaft 61 in a fixed position by means of the clamping screw 60, the adjustment of the screw 60 may be such that the lower vane structure is held in position by a frictional clamping action of the bearing roll 56 upon the shaft 35, so that it is necessary to apply some effort manually to change the angle of the vane; the frictional clamping action being such that the position of the vane will not become displaced as an incident of trolling or casting in water.

Various changes in the shape, size and arrangement of parts may be made to the form of invention herein shown and described without departing from the spirit of the invention or the scope of the following claims.

We claim:

1. In a fish lure the combination of a body, a hook construction connected with the body, a bearing fixedly connected with the body and extending forwardly thereof and providing a transverse bearing opening, a shaft rotatably supported in said bearing opening, means to contract the bearing opening upon the shaft to hold it rigid against rotation in the bearing, and vanes connected upon the ends of the shaft laterally of the bearing.

2. In a fish lure the combination of a body, an attaching strip detachably connected upon the bottom of the body forwardly thereof, a hook pivotally and swingably attached to the rear end of said attaching strip beneath the body, said strip having a forward end providing a barrel-shaped bearing, a shaft mounted in said bearing on a horizontal axis transversely of the axis of the body, means to clamp the shaft in fixed position in said bearing so that it may be rotatably adjusted therein, and vanes secured at the ends of the shaft forwardly of the body.

3. In a fish lure the combination of a body, an attaching strip detachably connected upon the bottom of the body forwardly thereof, a hook pivotally and swingably attached to the rear end of said attaching strip beneath the body, said strip having a forward end providing a barrel-shaped bearing, a shaft mounted in said bearing on a horizontal axis transversely of the axis of the body, means to clamp the shaft in fixed position in said bearing so that it may be rotatably adjusted therein, and vanes secured at the ends of the shaft forwardly of the body, in position for complete rotation thru 360° with respect to the body and in non-interfering relation therewith.

4. An artificial fish lure comprising a supporting body having a front surface, a vane structure comprising a mounting shaft having at the ends thereof a pair of vanes each provided with one concaved side and an opposite convexed side, a bearing connected with the forward portion of the body of the lure and projecting forwardly of the extreme front surface of the body and located at the lower portion of the body below the longitudinal axis of the body and rotatably securing the mounting shaft therein whereby the vanes may be rotated thru 360° to forwardly present them at varying angles and to present either the concave or convexed surfaces thereof.

5. As an article of manufacture a fish lure comprising an elongated body having a rear end tapered in diminishing relation; the front surface of the body being blunt and disposed in substantially a plane at an angle greater than 90° with respect to the top edge of the body and extending from the top edge of the body to the lower edge thereof, a pair of concavo-convex vanes, a bearing secured to said body and in advance of said front surface, means mounting said vanes rotatably in the bearing at the lower portion of the body below the normal longitudinal axis thereof for rotation on an axis located entirely forward of the blunt front surface of the body portion, said bearing so mounting the vanes that either the convex or concaved surfaces thereof may be presented forwardly at an angle within 360°, said vanes when feathered having the general planes thereof disposed entirely below the normal longitudinal axis of the body portion and located at the lower portion of the body portion.

MARVIN C. KOHLER.
WALTER H. TODD.

References Cited in the file of this patent

UNITED STATES PATENTS

| Number | Name | Date |
|--------|------|------|
| 1,200,135 | Reynolds | Oct. 3, 1916 |
| 1,209,641 | Olds | Dec. 19, 1916 |
| 1,505,883 | Gleason | Aug. 19, 1924 |
| 1,542,404 | Paulson | June 16, 1925 |
| 1,581,833 | Bonnett | Apr. 20, 1926 |
| 1,602,329 | Bonnett | Oct. 5, 1926 |
| 1,870,559 | Drake | Aug. 9, 1932 |
| 1,932,622 | Gruenhagen | Oct. 31, 1933 |
| 1,948,005 | Pflueger | Feb. 20, 1934 |
| 2,179,018 | Weidenmier | Nov. 7, 1939 |
| 2,277,453 | Phillips | Mar. 24, 1942 |
| 2,313,709 | Dunkelberger | Mar. 9, 1943 |